Oct. 10, 1967     T. D. BROWN     3,346,049
METHOD OF TREATING FORMATION WITH PRIOR REMOVAL OF DETRITUS
Original Filed April 7, 1964     2 Sheets-Sheet 2

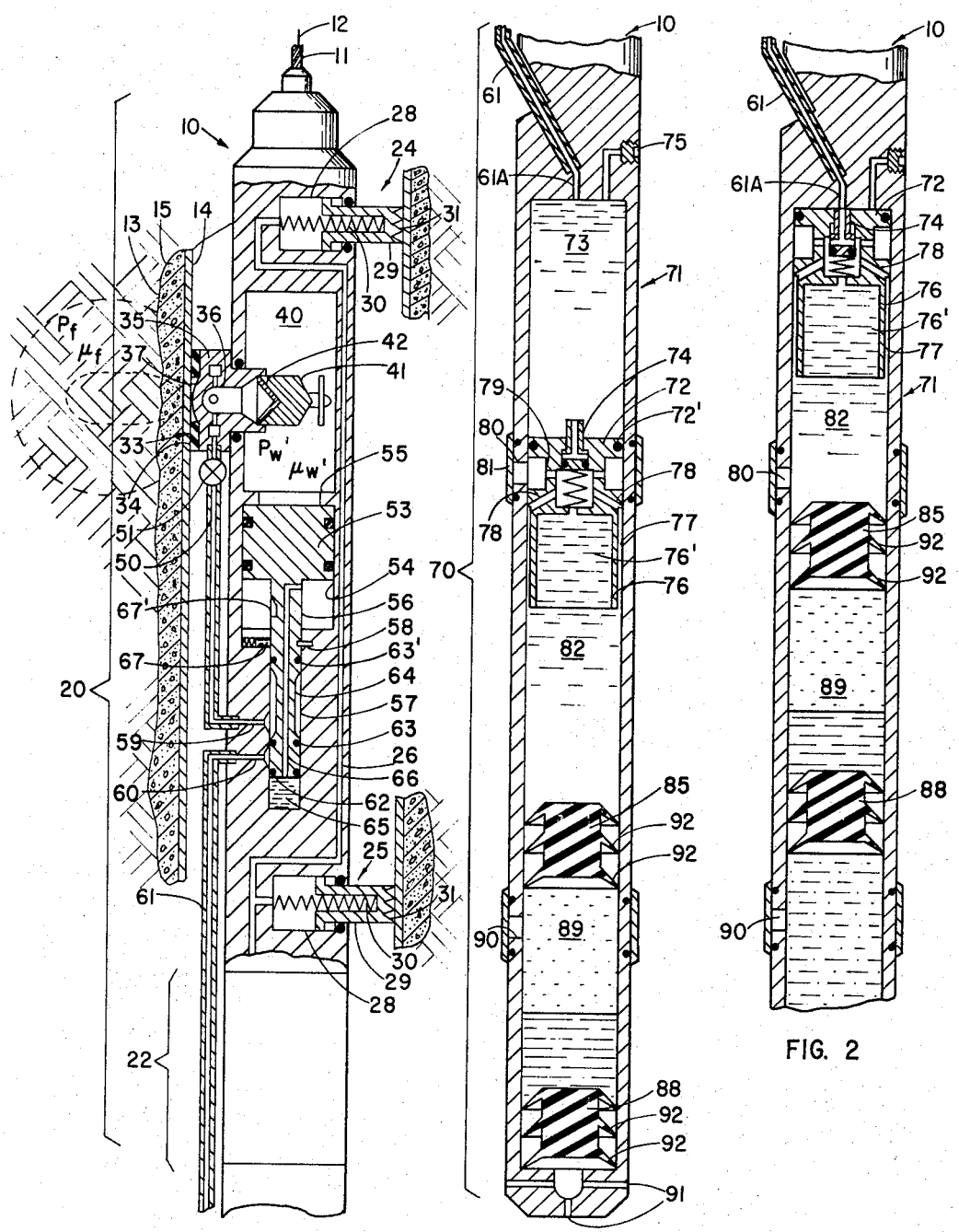

TIMOTHY D. BROWN
INVENTOR.

BY *Lyon + Lyon*

ATTORNEYS

United States Patent Office 3,346,049
Patented Oct. 10, 1967

3,346,049
METHOD OF TREATING FORMATION WITH PRIOR REMOVAL OF DETRITUS
Timothy D. Brown, Houston, Tex., assignor to Halliburton Company, Duncan, Okla., a corporation of Delaware
Original application Apr. 7, 1964, Ser. No. 358,036, now Patent No. 3,318,393, dated May 9, 1967. Divided and this application Nov. 10, 1966, Ser. No. 593,544
8 Claims. (Cl. 166—13)

ABSTRACT OF THE DISCLOSURE

In the practice of the method a formation treatment tool has a shaped charge within a chamber of sufficient size and low pressure to assure concomitant reverse flow of teritus into such chamber upon detonation of the charge in the step of piercing a casing wall and penetrating the formation. Formation treatment fluids are subsequently and sequentially injected into the penetrated formation through a path exclusive of such chamber within which such detritus had been previously collected. The formation treatment fluids include a phenol formaldehyde resin, an inert diesel oil and a catalyzing acid solution and a gel in that order.

---

The present application is a division of my co-pending patent application, Serial No. 358,036 filed April 7, 1964, now U.S. Patent 3,318,393 and assigned to the present assignee.

The present invention relates to the treatment of earth formations extending laterally of a borehole traversing such formation, and more particularly to method for performing formation treatment operations entailing the injection of materials thereinto.

In order to produce a cased well, it is necessary to establish fluid communication between formation fluids present in the pore space of the formation surrounding the well and the interior of the casing in order that such formation fluid may be brought to surface through such casing. Such fluid communication is usually provided by perforations penetrating the casing wall, cement sheath and the formation bearing the desired fluids. Normally such a simple completion procedure is satisfactory where the particles comprising the formation being produced are naturally and adequately cemented together, however, where the formation being produced is incompetent or unconsolidated, as where the particles are unbonded or are inadequately bonded, production trouble of serious nature arises. The trouble is that loose particles of the formation are produced through the perforations into the well bore to either cause serious problems of erosion and corrosion, or of choking the production from the well due to accumulation of such particles therein.

One use aspect of the present invention is demonstrated in connection with the alleviation of these troubles and problems. In this connection the invention is employed to force consolidating agents into the incompetent formation beyond the perforation. These agents operate to cement or bind adjacent formation particles together whereby a local formation volume is transformed to a permeable mass of substantial strength and dimensional stability. The permeable mass is, in effect, a filter constructed in situ which, in being located intermediate the unconsolidated formation and the production perforation, serves to block any unconsolidated formation particles which would otherwise be produced into the borehole along with the desired formation fluids.

Briefly, the present invention enables effective and economical localized treatment of formation through a casing wall for consolidation, or other purposes, e.g., acidizing, involving some or all of the functions including isolating, perforating, purging, injection of one or more treating agents, and transient or other plugging.

An object of the present invention is the provision of a method for efficiently and effectively performing more or less complex formation treatments, such as sand consolidation, beyond the casing wall of the well bore.

Another object of the present invention is the provision of a method of performing a number of adjacently spaced distinct formation treatments within a single formation zone whereby any influence on one such treatment due to an adjacent treatment is minimized.

Other and further objects of the invention will be obvious upon the understanding of the illustrative matter about to be described or will be indicated in the appended claims, and various advantages not referred to herein will occur to one skilled in the art upon the employment of the invention in practice.

Preferred forms of the invention have been chosen for purposes of illustration and description. These preferred forms are not intended to be exhaustive nor limit the invention to the precise forms disclosed. They are chosen and described in order to best explain the principles of the invention and their application in practical use to thereby enable others skilled in the art to best utilize the invention as may be best adapted to the particular uses contemplated.

In the accompanying drawings:

FIGURE 1A is a partial sectional view illustrating, in a somewhat schematic manner, the upper portion of one form of apparatus used in the practice of the invention and showing the same deployed in a cased wall bore;

FIGURE 1B is a partial sectional view illustrating the lower portion of the apparatus of FIG. 1A;

FIGURE 2 is a view partially showing the apparatus of FIG. 1B and showing elements thereof as they may be deployed during an intermediate stage of operation;

Figure 6:
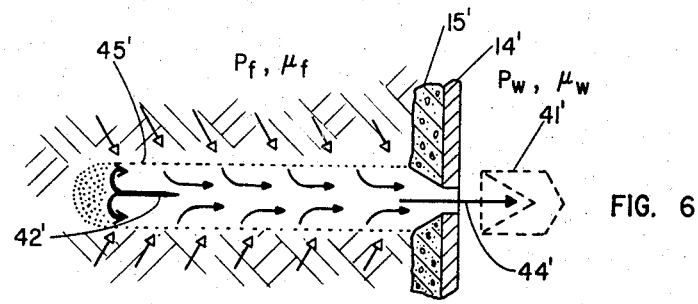
FIGURE 6 is a vertical sectional view taken laterally of a borehole and showing casing, cement sheath and earth formation, and illustrating, in a perhaps stylized manner, a perforation in the process of being provided therein.

Referring to the FIGURES 1A and 1B of the drawings, the apparatus comprises a body, generally designated as 10, having being lowered by a wireline 11 within a well bore 13 traversing an earth formation to be treated. As shown, the well bore 13 is sheathed by a casing 14 and an intermediate layer of cement 15. The apparatus is shown in an actuated disposition in sealed anchored engagement with the casing wall adjacent a formation zone intended for treatment. Wireline 11 is provided with a central conductor 12 for communicating electrical signals from the surface for actuating various remotely controllable elements of the apparatus. The body 10 is generally comprised of an upper section 20, including components for actuation, anchoring, sealing, perforating and injection, together with elements for exerting general control over the operation of the apparatus; and a lower section 70 which primarily functions as a carrier of segregated treatment agents for injection into the formation to be treated.

A hydraulic fluid supply and pressure generator 22 is provided in the lower portion of upper section 20 for the purpose of supplying hydraulic fluid to a hydraulic actuation system at a pressure higher than the pressure of fluids normally present within the borehole. Although the pressure generator 22 may be of any suitable type, where it is desired to utilize the hydrostatic pressure energy of a borehole fluid as a source of power, a differential pressure type of generator, including remote control valves to control the same, such as is disclosed by Chambers in Patent No. 2,674,313 may be preferred. This type of pressure generator is adapted to produce the required pressurized fluid pursuant to a first electrical signal transmitted from the earth's surface, and to dump and relieve the pressure in the hydraulic actuation system pursuant to a second electrical signal transmitted from the earth's surface.

The output of hydraulic pressure generator 22 is connected to the hydraulic actuation system including piston-cylinder type upper and lower actuator elements, 24 and 25 respectively, by means of a fluid passageway 26. The actuator elements 24 and 25 may identically comprise a cylinder-like concavity 28 in body 10 receiving a plunger 29 which extends in sealed slidable engagement with and laterally of the body 10. Although the plungers 29 are shown extended in FIG. 1A, they are normally maintained in a retracted position in their respective concavities 28 by suitable bias provided by springs 30. With this arrangement, the actuator elements 24 and 25 are adapted to extend their respective plungers 29 toward the borehole wall in response to pressurized hydraulic fluid being supplied via passageway 26 from the pressure generator 22, and to retract into their respective concavities 28 in response to bias of springs 30 acting with the pressure of borehole fluid acting on the distal ends thereof when the actuating fluid pressure is removed during the dump cycle of the pressure generator 22. The function of the actuators 24 and 25 is to extend laterally of the body 10 to engage a wall portion of the casing 14, and, thereupon, move the body 10 laterally in an opposite direction to force a sidewall sealing assembly 33 into sealing engagement with an oppositely disposed casing wall portion to accomplish isolation of a casing wall portion from the general fluid environment of the borehole. The distal ends of the plungers 29 are provided with hardened serrated surfaces 31 which are adapted to cut into the casing wall when urged thereagainst, to thereby accomplish an effective anchoring of the body 10 and prevent any shifting of the same in the casing during the remainder of the operation sequence to be described hereinafter.

As illustrated, actuator elements 24 and 25 are spaced apart along the body 10 in vertically straddling and opposed relation to the sidewall sealing assembly 33. Within the space thus provided between the actuator elements, there is provided a chamber 40 which functions as a carrier space for an explosive perforator element, such as the shaped charge 41 and metallic liner 42 illustrated, as well as functioning to provide a local fluid environment of controlled or predictable character, insofar as pressure and kinematic viscosity properties thereof are concerned, upon the firing of the explosive charge 41.

Sidewall sealing assembly 33 is comprised of an annular sealing element 34 of rubber-like material, and a port plug 35 which extends in sealed relation through the body 10 into the chamber 40. The portion of the port plug 35 which extends within the chamber 40 is configured to receive the conically concave lined end of charge 41 to position the same so that the jet or perforating axis thereof, i.e., the axis of the concave end, coincides with the axis of a perforating passageway 36 in the port plug 35. A thin wall 37 normally closes the perforating passageway 36, but is adapted to be easily breached by the jet, comprised of a metallic liner 42, when the same, projected from the chamber 40 upon the firing of the charge.

Figure 3:
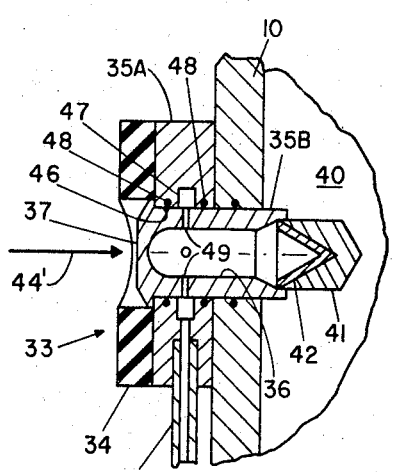
FIGURE 3 is a sectional view of a portion of the apparatus of FIG. 1A, showing the sealing, perforating and injection arrangement thereof in greater detail.

Referring now to FIG. 3, wherein sidewall sealing assembly 33 is shown in greater detail, port plug 35 is seen to be comprised of a flange-like element 35A to which the annular sealing element 34 is attached, as by vulcanization, and a port plug per se 35B which extends in sealed relation to a bore 46 provided in the flange-like element. The flange-like element 35A is provided with an annular plenum 47, generally coaxial with respect to bore 46, and a pair of O-ring seals 48 disposed in straddled relation to the plenum 47 for sealing engagement with the exterior of the port plug 35B. The port plug 35B is provided with a number of injection passageways 49 extending radially from plenum 49 intermediate the O-ring 48 and communicating with perforating passageway 36. Plenum 47 is in fluid communication with an injection conduit 50 which extends from the flange-like element 35A exteriorly of the body 10. Conduit 50 may desirably be provided with a check valve 51 disposed to pass fluids flowing toward plenum 47, but to block any fluid flow from the plenum 47 along the conduit 50. The relationship of the radial injection passageways 49 with respect to perforating passageway 36 will be discussed in greater detail hereinafter.

The lower end of chamber 40 is defined by the top surface of a piston 53 in sealed slidable engagement within a cylinder 54 provided in body 10 in communication with chamber 40, but set apart therefrom by an inwardly directed flange 55. Piston 53, initially positioned in abutting relation to the flange 55, is adapted to be displaced downwardly in cylinder 54 in response to pressures within chamber 40. Piston 53 is provided with a depending rod portion 56 which extends in sealed slidable engagement within a bore 57 provided in the body 10. Piston 53 and rod 56 are normally maintained in a upward disposition by a shear pin 58. The lower end of conduit 50 communicates with the bore 57 by means of a passageway 59 opening thereinto. Bore 57 also communicates by means of a passageway 60 with an injection conduit 61 which extends externally of the body 10 to the lower section 70 of the apparatus. The lower end of rod 56 is provided with spaced-apart seals 62 and 63 which, in the normal position of rod 56, served to block fluid communication from passageway 60 to the bore 57 and thus constitute a valve normally blocking fluid communication between the conduits 50 and 61. The rod 56 is also provided with an annular groove 64 which, when the rod is displaced downwardly, provides for fluid communication between the conduits 50 and 61 when the rod is actuated downwardly. An O-ring seal 63′ is provided such that it, together with O-ring seal 63, seals each side of groove 64. With the rod 56 in the upward or normal position, a space 65 is defined in the lower extremity of bore 57, which space is filled with a liquid, e.g., a silicone oil, having a slight amount of compressibility. The space 65 is communicated with cylinder 54 beneath piston 53 by means of a constricted high-resistance fluid flow path 66. The speed of the displacement of piston 53 and rod 56, in response to the pressure chamber 40, is controlled by the rate of displacement of the liquid from space 65 into chamber 54. This accomplishes a desired delay in communicating the conduits 50 and 61 subsequent to the firing of shaped charge 41. Of course, sufficient space remains in cylinder 54 beneath 53 after its full stroke to receive the entire volume of liquid originally contained in the space 65. When the piston 53 and rod 56 go full stroke in response to pressures in chamber 40, a spring loaded detent 67 provided in the body 10 engages a groove 67′ provided in the rod 56 to maintain the same in an actuated disposition.

Lower section 70 includes a container 71 for housing such treating agents as may be desired for injection into the formation zone. The container 71 is in fluid communication at its upper end with conduit 61 such that when a fluid flow path is established to the formation zone as described hereinafter, the treating agent or agents within the container 71 will be injected into the formation under the motivation of the difference in pressure of borehole fluids in excess of the pressure of formation fluids. Although the example of the following description is devoted to the employment of the container 71 so as to serially inject plurality of treating agents and yet substantially segregate reactive ones of such agents, it will be apparent that the container 71 may be employed to injected a single treating agent into the formation. Further, although the pressure energy of borehole fluid is employed for injection power in the illustrated embodiment, it will be evident that other suitable energy source, such as a propellant gas generator as disclosed by commonly assigned Briggs Patent Number 3,090,436, granted May 21, 1963, as well as by Reynolds Patent Number 3,115,932, granted December 31, 1963, for "Apparatus for Consolidating Incompetent Subterranean Formation," may be employed if desired.

When the apparatus is employed for operations, such as sand consolidation, which involves a plurality of treating agents, the container 71 is provided with a plurality of floating or free pistons for the purpose of segregating the various agents involved. In such a situation, a first free piston 72 is provided within the container to define therein a first fluid compartment 73 at the upper end of the container. This first compartment, in the case of a sand consolidation operation, would contain a binding agent, such as a phenol formaldehyde resin, for example, adapted to be hardened after injection into the formation either by passage of time or by exposure to a subsequently injected catalytic or reactive agent. The compartment 73 may be filled with this first injection agent via a fill port shown closed by a plug 75.

Piston 72 is sealed near its upper end with respect to the walls of the container 71 by means of an O-ring seal 72' so that fluid communication thereacross is blocked. A valve 74, normally biased toward a closed position, is provided in the piston 72. A portion of the valve extends upwardly of the upper surface of piston 72 such that when the same contacts the upper end of the container 71 pursuant to traverse of the piston 72, the valve is opened and fluid communication is established through the piston 72. The upper portion of valve 74 is tubular and is co-axially positioned with respect to a passageway 61A connecting the container 71 with the conduit 61, such that when the valve is opened passageway 61A and the bore of the tubular upper end of valve 74 comprise a fluid flow path effectively by passing compartment 73 and any residual amounts of the first fluid remaining therein. Piston 72 is provided at its lower surface with a thin-walled skirt extension 76 sized to provide an annular fluid flow clearance 77 between the outside of the skirt extension and the interior wall of the container 71. The clearance 77 is communicated at its upper end with the valve 74 by means of passages 78. Piston 72 is also provided with an annular recess 79 which, in the initial position of the piston 72, is in communication with a fill port 80, the passages 78 and the interior of the skirt extension 76. The fill port 80 is provided for filling a second compartment 82 with a second treating agent. Compartment 82 is defined between the seal 72' of piston 72 and the upper surface of a second free or floating piston 85 spaced from piston 72 within the container 71. Fill port 80 may be closed by any suitable means such as by the straddle sealed cylindrical sliding closure 81, as shown. In the exampled sand consolidating operation in connection with which the apparatus is being described, the treating agent in chamber 82 is preferably a fluid which is inert as to the phenol formaldehyde resin in chamber 73. Diesel oil has been found to be satisfactory.

A third free floating piston 88 is provided in container 71 spaced from the piston 85 to define therebetween a third compartment 89 adapted to be filled with treating agents by means of a fill port 90, similar to fill port 80. In the case of the exampled sand consolidating operation, the third chamber 89 carries the third treating agent which is effective to harden the first treating agent previously injected from chamber 73. In the case of the resin exampled above, the third fluid may be a diesel oil solution of oil-soluble acid.

In addition, to the acid-diesel oil solution, the chamber 89 may carry a fourth agent, if it is desired to temporarily plug a perforation after the formation thereabout has been consolidated. This fourth agent may be a low water loss gel adapted to form a temporary plug. When such a gel is employed, the perforation will remain plugged for a predetermined time at a given borehole temperature, at which time the gel will break down and, in effect, unplug the perforation. One example of such a gel having suitable breakdown times at moderate borehole temperature is as follows:

1.2 grams ammonium persulphate
14.4 grams guar gum
1.44 grams sodium borate
1000 cc. of saturated brine The exampled gel, in being water based, is heavier than and immiscible with the diesel oil containing the catalyzing agent, and therefore these two agents may be contained within the same chamber without any substantial mixing.

The lower end of container 71 is provided with openings 91 admitting borehole fluids therethrough to the underside of piston 88. Since the pistons 88, 85, and 72 are free or floating within the container 71, these pistons particularly pistons 85 and 88, function primarily as separators of the various fluids within the container 71 and are efficient pressure force transmitters. The result is that the pressure of all the treating agents in container 71 is substantially equal to the hydrostatic pressure of borehole fluids, which pressure is the active force employed by the illustrated embodiment in the injecting phase of a formation treatment as will appear.

The pistons 85 and 88, in functioning as separators with no pressure differential thereacross, may be of the wiper type shown having a plurality of resilient, chevron-like, sealing portions 92 which extend radially thereof to sealingly, but slidably, engage the bore of the container 71. The wiper type pistons are desirable in that they may traverse a discontinuity in the container wall such as filler ports 80 or 90 and still maintain an effective separation of fluids.

Assuming for the moment that fluid communication has been established between the formation fluid and the container 71, the lower section 70 of the apparatus will automatically operate as follows. Since the treating agents within container 71 are at a pressure equal to the hydrostatic pressure of the borehole and since this pressure is effectively higher than the pressure of formation fluids in the normal borehole situation, fluids within the container 71 will flow into the formation under the influence of this effective pressure differential. The first fluid to flow will, of course, be from the first compartment 73, and as this fluid is displaced, the various pistons and fluids therebelow will be moved upwardly at a rate corresponding to the rate that chamber 73 is being reduced in size by virtue of the flow therefrom. When substantially all of the first fluid has been displaced into the conduit 61, the piston 72 will have contacted the upper end of the container 71 and valve 74 will have been opened by such contact. This establishes a new flow condition, illustrated in FIG. 2 of the drawing, wherein the second fluid in compartment 82 is flowing through the opened valve 74, passageway 61A, and conduits 61 and 50 into the formation being treated. In this flow condition the second fluid may flow either through the recess 76' defined by the skirt 76 or through the fluid flow clearance 77 and thence via passages 78 to the opened valve 74. As the second fluid is displaced ahead of piston 85, the volume of chamber 82 is reduced by the piston 85 approaching piston 72. This flow condition is terminated by the piston 85 entering or being swallowed by the recess 76' defined by the thin wall skirt 76. Although the inside diameter of the recess 76' is somewhat smaller than the bore of container 71, piston 85 may enter the same in that the resilient chevron-like sealing portions 92 thereof are compressed or distorted in the entry. The length of the recess 76′ is, of course, sufficient to completely house the piston 85, so that when the piston 85 has entered the same, the piston 85 is no longer in sealing engagement with the walls of the container. When this occurs, the third fluid in compartment 89 is communicated through the valve 74, passageway 61′, and conduits 61 and 50, via annular flow clearance 77 and the passages 78. Thus it is seen that the entry of the piston 85 into the recess of piston 72 executes a valving function whereby the third and fourth fluids may flow, in that order, into the formation. From the foregoing, it is then seen that once the injection operation is started by the establishment of fluid communication with the formation, the lower section 70 of the apparatus will automatically perform a serial injection of the first, second, third and fourth treating fluids in the order named.

It is generally desirable in apparatus for performing serial injections of different treating agents into a formation zone to minimize any mixing of such agents within the apparatus. This is particularly important with agents that are chemically active with respect to one another, such as the exampled phenol formaldehyde resin and its catalyzing acid, where mixing of the active agents within the apparatus may result in plugging and the aborting of the injection operation. It is in this connection that the exampled inert agent, i.e., diesel oil, is employed. Within the container 71 it serves to more effectively segregate the first and third agents by physical spacing within the container 71. During the injection cycle, the inert or second agent in compartment 82 takes substantially the same flow path through the apparatus as the first agent and serves to cleanse the flow path of residual quantities of the first agent. The effectiveness of this cleansing action is enhanced by a fluid flow velocity over the path which gives rise to a scouring action tending to remove any residual films from the wall of the flow path. By way of example, a flow area in conduit 50 of .049 square inch has given satisfactory results in scouring the exampled resin at injection rates which have been experienced.

A perforation establishing fluid communication between a well bore and the adjacent earth formation should present a large maximized flow area to fluid entering the perforation from the formation, or the borehole, in order that the perforation may have a maximized flow capacity with any given differential pressure thereacross. This type of perforation, i.e., a clean perforation, is believed particularly desirable in formations of varying degress of incompetence and which are to be treated by injection of consolidating or binding agents. The reason for this is that the natural permeability of the formation will be reduced within a volume of consolidated material about the perforation, but provided the perforation has a maximized flow area, the overall effect on perforation flow is minimized.

Although a typical well bore perforation may have an adequate depth of penetration it is typically initially filled with impacted with detritus (both from the formation and from the perforator) to such an extent that an adequate or maximized flow area is not initially provided. Such an impacted perforation may be subsequently cleaned up by productive flow under some conditions, but a perforation through which a consolidation treatment is immediately performed, if not initially clean with a maximized flow area, will never become so because the impacted detritus will be consolidated along with the formation.

Referring to FIGURE 6, a desirable perforation 45′ through a casing wall 14′, a cement sheath 15′ and the formation therebeyond is shown in the process of being formed by a jet 42′ emanating from a shaped charge 41′, together with flow-indicating arrows illustrating a flow condition believed effective in producing such a clean perforation. In the illustration, flow of formation fluid toward and into the perforation is indicated by arrows with open or unshaded arrowheads. Within the perforation, flow of formation fluids admixed with perforation detritus entrained therein is illustrated by arrows having shaded arrowheads. These shaded arrows converge and pass through the perforation in the casing wall 14′ where such converged flow is indicated by a vector 44′ directed toward the shaped charge 41′ which produced the jet 42′. Although it is believed that such illustrated flows take place concomitantly with the penetration of the jet 42′ under certain discovered conditions, it is known that when the perforation is made under these conditions, a clean perforation 45′ of maximized flow area is produced. The conditions which dependably give rise to a clean perforation are those wherein the following relationship of borehole and formation fluid parameters obtains.

$$\left[\frac{P_f - P_w}{P_w}\right]\left[\frac{\mu_w}{\mu_f}\right] > 1$$

where
$P_f$ is the pressure of formation fluid,
$P_w$ is the pressure of well bore fluid,
$\mu_w$ is the kinematic viscosity of the well bore fluid, and
$\mu_f$ is the kinematic viscosity of formation fluid.

Perforating conditions wherein the above relationship obtains are assured through the control of the pressure and viscosity of fluids within chamber 40 during the perforating process. To this end, chamber 40 is preferably filled with a low pressure gas, say air and atmospheric pressure, and is of a volume such that it may contain any gases evolving from the shaped charge 41, when the same is fired, at a pressure suitably low for the relationship to obtain. By way of example, it has been found experimentally that if RDX is employed as the primary explosive, and if chamber 40 is of a size providing approximately 5 cubic inches of atmospheric pressure gas volume per gram of RDX employed, then the gas generated upon the firing of the shaped charge will produce a pressure within the chamber on the order of 300 pounds per square inch. This pressure value, together with the kinematic viscosity value of the combustion products, is appropriate to produce a clean perforation under many formation borehole fluid situations. Of course, the total volume of the chamber 40 should be adequate to receive all the detritus and formation fluid comprising the counter flow.

With further reference to FIGURE 3 the counter flow vector 44′ (discussed in relation to FIGURE 6) is shown in the relation it bears to the apparatus portion illustrated. Although the perforating charge 41 is shown unfired and the perforation has yet to be made, the relationship illustrated shows the counter flow vector 44′ directed along the center line of perforating passageway 36 and the axis of the charge 41. It will be noted that the injection passageways 49 are disposed in perpendicular relation to the counter flow vector 44′, which relationship is effective to minimize entry of detritus carried by the counter flow into the passageways 49. This has been found to be of considerable importance in providing a reliable fieldworthy tool, inasmuch as entry of detritus in the injection system may tend to plug the same and abort an injection operation.

Figure 4:
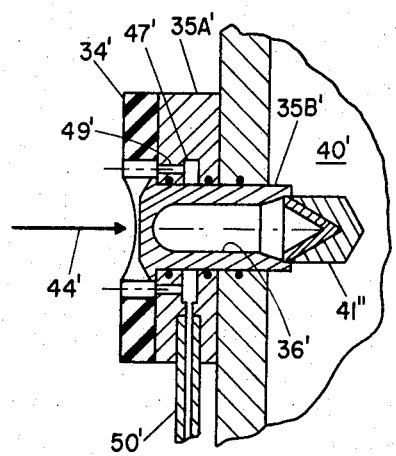
FIGURE 4 is a sectional view, similar to FIG. 3, illustrating an alternate embodiment of the sealing perforating and injection arrangement.

FIGURE 4 shows an alternate construction of that portion of the apparatus illustrated in FIG. 3. The components of FIG. 4 are similar, for the most part, to those in FIG. 3 and carry similar reference numerals differentiated by prime marks. FIG. 4 provides another embodiment wherein detritus carried by the counter flow vector 44′ is substantially prevented from entering the injection passageways 49′. In this embodiment it will be noted that the port plug 35B′ has no communication with the injection system, but, rather, the injection passageways 49′ are disposed in parallel relation to the counter flow vector 44′ such that no component of such vector exists along the injection passageways which would tend to drive particles carried by the counter flow thereinto.

Figure 5:
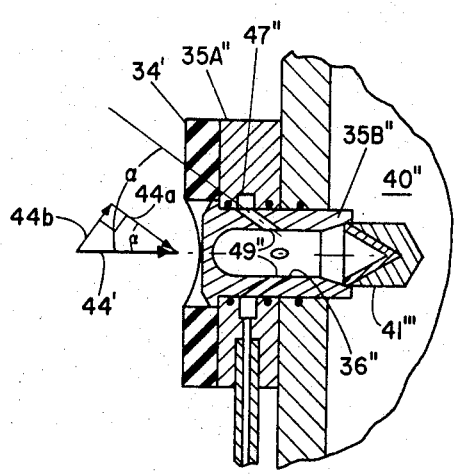
FIGURE 5 is a sectional view, similar to FIG. 3, of still another embodiment of the sealing, perforating and injection arrangement.

FIGURE 5 illustrates a modified apparatus portion generally similar to those illustrated in FIGS. 3 and 4. Because of the similarity to FIGS. 3 and 4, common reference numerals with delineating prime markings are employed. The embodiment of FIG. 5 illustrates still another arrangement of the injection passageways 49" with respect to the counter flow vector 44', the perforating passageway 36' and the jet charge axis. In this arrangement, injection passageways 49" are inclined at an angle α with respect to the vector 44' and the flow passageway. This angular disposition is such that if the counter flow vector 44' is resolved into components along 44a and perpendicular 44b to the injection passageways 49", the component 44a along the passageways 49" will be directed toward the perforating passageway 36". With this sort of disposition, the influence of the component 44a along the injection passageway 49" will tend to purge the same to accomplish a more positive way of preventing detritus from the counter flow from entering the injection system.

With respect to the embodiments of FIGURES 3, 4 and 5, it will be seen that the injection passages 49, 49', 49" are disposed with respect to the counter flow vector 44' such that no substantial component of this vector exists which would tend to cause detritus carried by the counter flow 44' to enter the injection system of the apparatus.

OPERATION

In carrying out a treating operation with the present apparatus and method, apparatus would be chosen having a chamber 40 of such volume that, after accomodating the gases from the explosive employed, the pressure $P_w$, in the chamber will be of sufficiently low value in relation to the kinematic viscosity $\mu_w$, of the combustion products, as well as in relation to the pressure and kinematic viscosity of formation fluids (previously obtained by formation sampling procedures, for example) to satisfy the above discussed relationship defining perforating conditions which will yield a clean perforation of maximized flow area.

Having selected suitable apparatus, such apparatus would be lowered into the borehole and borehole fluid environment (usually provided in the borehole for purposes of pressure control and the like) by means of wireline 11 to a depth such that the annular seal element 34 is located adjacent the formation zone intended for perforation and treatment. When so positioned, a suitable electrical signal is applied to the conductor 12 of the wireline to initiate operation of the pressure generator 22 which, as previously brought out, supplies hydraulic fluid a super-hydrostatic pressure to force the plungers 29 of upper and lower actuator elements laterally of the body 10. This results in the annular seal element 34 being thrust into sealing engagement with the wall of the casing to isolate a part thereof from the general borehole fluid environment and to anchor the body 10 against displacements in the course of the operation. This anchoring is obtained by virtue of the hardened serrations 31 on the end of plungers 29 cutting into the wall of the casing 14. It will be appreciated that if the annular seal element 34 should shift with respect to the perforation to be formed through the casing, the fluid communication between the apparatus and the formation through the casing perforation would be lost and any attempt at injection of treating agents into the formation would be aborted.

After the apparatus has been thus placed in sealed anchored engagement within the borehole, the shaped charge 41 may be fired to the agency of the usual prima cord and blasting cap arrangement which is, in turn, activated by a second electrical signal communicated from the earth's surface over the wireline. The jet ensuing from the firing of the shaped charge and making the perforation also establishes fluid communication between the perforation in the formation and the chamber 40 so that counter flow 44' ensues to produce the clean perforation desired.

Shock wave forces produced by the explosive of the charge 41 upon firing, act on the upper surface of the piston 53 to displace the same and rod 56 downwardly to shear the shear pin 58. The small compressibility of the fluid in space 65 permits a slight downward movement to accomplish shearing of shear pin.

The counter flow into chamber 40 increases the pressure therein until it is equal to the pressure of formation fluids, whereupon the counter flow ceases. The pressure in chamber 40 acts on the top of piston 53 and urges the same downwardly at a rate limited by the rate fluid flow through the restricted passageway 66 into the space provided below the piston 53. This limitation on rate provides a time delay on the order of one to four seconds between the firing of the charge and the communication of passages 59 and 60 pursuant to motion of groove 64 into bridging, fluid conducting relation between the ends of passageways 59 and 60. Upon this happening, fluid communication is established between the formation and the container 71, whereupon treating agents in the container will be forced therefrom into the formation by virtue of the pressure differential toward the formation.

Assuming a sand consolidating operation is performed with treating agents previously exampled, the lower section 70 would operate as previously indicated. First, the phenol formaldehyde resin in chamber 73 would be injected into the perforation and formation thereabout. Next, the inert diesel oil would be injected from chamber 82 to drive or displace the resin from the perforation into the formation and, further, to over displace the resin within the formation to remove any excess as may occupy space between the grains of sand that constitute the formation, a film of the first fluid being retained about the sand grains by capillary forces. Next, the third or catalyzing agent, i.e., the acid solution is injected to overdrive the second fluid whereupon the catalyst makes contact with the plastic film previously established about the formation particles. This contact operates to harden the plastic film and bind the sand grains together and impart new strength to the unconsolidated material about the perforation. Since limited quantities of material may be contained in wireline apparatus, it would be evident that only limited volumes of formation may be consolidated in a given operation with such apparatus. Nevertheless, such limited quantities are affective to produce an effective screen or filter about the perforation adjacent the well bore wall with sufficient permeability to pass the desired fluids for production but to exclude unconsolidated formation particles.

If it is desired to perform other perforating and consolidating operations within the same unconsolidated zone, it may be desirable to temporarily plug the first perforation in order that pressures of the borehole will not be communicated to the productive zone. In this event, a fourth agent, such as the previously exampled gel, may be provided in the third chamber 89 and placed in the perforation following hte injection of the third agent. The gel, when placed in the perforation, is effective to block communication of borehole fluid pressure to the formation for a predetermined time, depending on the particular gel selected. If the subsequent consolidating operation is performed within th epredetermined time, it may be carried out in the same manner as the first consolidating operation, i.e., without being influenced by another adjacent perforation.

After the injection operation has been completed, the apparatus may be withdrawn from the borehole upon the retraction of actuator elements 24 and 25. This is accomplished by transmitting a suitable signal to the pressure generator 22, whereupon the pressure in the hydraulic system is dropped to a pressure less than the hydrostatic pressure of borehole fluids, so that the hydrostatic pressure of the borehole forces the plungers 29 of the actuators back to a retracted disposition in the body of the apparatus.

Thus, it has been seen that the apparatus and method of the invention provides an efficient and economical solution to problems associated with the treatment of formations adjacent a perforation. It has further been seen, in connection with the exampled treatment, that the method and apparatus of the present invention enables reliable sand consolidating treatment of formations wherefrom sand is being produced or is likely to be.

As various changes may be made in the method and constructions herein described without departing from the spirit and scope of the invention and without sacrificing any of its advantages, it is to be understood that all matters herein are to be interpreted as illusrative and not in any limiting sense.

What is claimed is:

1. The method of treating a permeable formation zone containing formation fluid under pressure and traversed by a cased borehole containing a column of fluid extending upwardly of said zone and providing a hydrostatic pressure environment therein greater than said formation fluid pressure, comprising the steps of providing a volume of gas at a pressure less than formation fluid pressure within said casing and hydrostatic environment, perforating said casing therewithin in a first direction along an axis to breach the casing wall and establish fluid communication with the formation therebeyond to induce a concomitant flow of formation fluid along said axis opposite said first direction by communicating said formation fluid with said volume of gas, whereby said perforation is substantially purged of detritus and said detritus enters said volume and is collected therein; and injecting a treating fluid into said formation zone via said purged perforation through a path exclusive of said volume.

2. The method of treating a permeable formation zone containing formation fluid under pressure and traversed by a cased borehole containing a column of fluid extending upwardly of said zone and providing a hydrostatic pressure environment therein greater than said formation fluid pressure, comprising the steps of providing a volume of gas at a pressure less than formation fluid pressure within said casing and hydrostatic pressure environment; imparting kinetic energy to a mass from within said casing in a first direction along an axis to breach the casing wall and perforate the formation therebeyond to induce a concomitant expulsive flow of formation fluid along said axis opposite said first direction by communicating said formation fluid with said volume of gas which is collected in said volume, whereby said perforation is substantially purged of detritus; and injecting a treating fluid into said formation zone via said purged perforation through a path exclusive of said volume.

3. The method of treating a permeable formation zone containing formation fluid under pressure and traversed by a cased borehole containing a column of fluid extending upwardly of said zone and providing a hydrostatic pressure environment therein greater than said formation fluid pressure, comprising the steps of providing a volume of gas at a pressure less than formation fluid pressure within said casing and enveloped within said hydrostatic pressure environment; imparting kinetic energy to a mass from within said casing in a first direction along an axis to breach the casing wall and perforate the formation therebeyond to induce a concomitant expulsive flow of formation fluid along said axis opposite said first direction by communicating said formation fluid with said volume of gas, whereby said perforation is substantially purged of detritus which is collected in said volume; and injecting a treating fluid into said formation zone via said purged perforation through a path exclusive of said volume.

4. The method of treating an unconsolidated formation zone containing formation fluid under pressure within the permeable space thereof and traversed by a cased borehole containing a column of fluid extending upwardly of said zone and providing a hydrostatic pressure environment therein greater than said formation fluid pressure, comprising the steps of providing a volume of gas at a pressure less than the pressure of formation fluid within said casing and hydrostatic pressure environment, perforating said casing from therewithin in a first direction along an axis to breach the casing wall and cement and establish fluid communication with formation fluid in said zone therebeyond to induce a concomitant flow of formation fluid along said axis opposite said first direction by communicating formation fluid with said volume of gas whereby said perforation is substantially purged of detritus which is collected in said volume; consolidating the unconsolidated formation adjacent said fluid communication but preserving substantial permeable space therein by flow of fluids to said perforation through a path exclusive of said volume; and treating said consolidated formation adjacent said perforation to exclude borehole fluid from the permeable space of said consolidated formation for a predetermined time subsequent to said treatment by flow of fluid to said perforation through a path exclusive of said volume.

5. The method of treating the permeable space of a permeable formation zone containing formation fluid under pressure and traversed by a cased borehole comprising the steps of providing a volume of gas at a pressure less than formation fluid pressure within said casing; perforating said casing from therewithin in a first direction along an axis to breach the casing wall and establish fluid communication with the permeable space of the formation therebeyond to induce a concomitant pulse flow of formation fluid along said axis opposite said first direction by communicating said formation fluid with said volume of gas, said axis defining a first path; and injecting a treating fluid into said permeable space via a path which is exclusive of said volume.

6. The method of perforating a permeable formation zone containing a formation fluid under pressure and traversed by a cased and cemented borehole containing a column of fluid extending upwardly of said zone and providing a pressure environment for pressure control in said borehole, comprising the steps of: providing a volume of gas at a pressure less than the pressure of said formation fluid within said casing and enveloped by said pressure environment at the instant of perforating; imparting kinetic energy to a mass and directing the same from within said casing in a first direction along an axis to breach the casing wall and cement and perforate the formation therebeyond to induce a concomitant flow of said formation fluid along said axis opposite said first direction by communicating said formation fluid with said volume of gas at the instant of breaching said casing wall and cement by said mass, whereby said perforation formed by the passage of said mass is substantially purged of detritus which is collected in said volume; and placing a temporary blocking agent in said perforation to exclude the pressure control fluid of said column from entering the same for a predetermined time by flowing a fluid to said perforation through a path exclusive of said volume.

7. The method of perforating a permeable formation zone containing a formation fluid of known kinematic viscosity value $\mu_f$, and a known pressure value, $P_f$, and traversed by a cased borehole containing a column of borehole fluid extending upwardly of said zone and providing a general pressure environment for pressure control in said borehole, comprising the steps of: establishing a local fluid environment within said general pressure environment characterized by kinematic viscosity and pressure values, $\mu_w$ and $P_w$ respectively, such that the relationship $$\left[\frac{P_f - P_w}{P_w}\right]\left[\frac{\mu_w}{\mu_f}\right]$$

has a value greater than untiy; perforating said cased borehole to communicate said formation fluid to said local fluid environment; and injecting a formation treatment fluid into said perforation through a path which is exclusive of said environment.

8. The method of perforating a permeable formation zone containing a formation fluid under pressure and traversed by a cased and cemented borehole containing a column of fluid extending upwardly of said zone, and providing a general pressure environment for pressure control in said borehole, comprising the steps of: providing a volume of gas at a pressure less than the pressure of said formation fluid within said casing; isolating a space extending between said volume of gas and the wall of said casing adjacent said zone from said general pressure environment; imparting kinetic energy to a mass and directing the same from within said casing in a first direction along an axis extending through said space to breach the casing wall and cement and perforate the formation therebeyond to induce a concomitant flow of said formation fluid along said axis opposite said first direction by communicating the same with said volume of gas at the instant of breaching said casing wall and cement by said mass; and placing a temporary blocking agent in said perforation to exclude the pressure control fluid of said column from entering the same for a predetermined time by flowing a fluid to said perforation through a path exclusive of said volume.

References Cited
UNITED STATES PATENTS

| | | | |
|---|---|---|---|
| 2,751,009 | 6/1956 | Wooddy | 166—22 |
| 3,115,932 | 12/1963 | Reynolds | 175—4.52 |
| 3,121,459 | 2/1964 | Van Ness et al. | 166—100 X |
| 3,153,449 | 10/1964 | Lebourg | 166—100 X |
| 3,180,416 | 4/1965 | Smith | 166—1 X |
| 3,212,576 | 10/1965 | Lanmon | 175—4.52 X |
| 3,273,647 | 9/1966 | Briggs et al. | 166—100 |

CHARLES E. O'CONNELL, *Primary Examiner.*

DAVID H. BROWN, *Examiner.*